United States Patent
Carlson et al.

[15] 3,650,611
[45] Mar. 21, 1972

[54] FILM FOOTAGE INDICATOR

[72] Inventors: Richard K. Carlson, Chicago; Henry J. Koeber, Deerfield, both of Ill.

[73] Assignee: Bell & Howell Company, Chicago, Ill.

[22] Filed: Sept. 2, 1969

[21] Appl. No.: 854,479

[52] U.S. Cl. ...................................................352/172
[51] Int. Cl. ...................................................G03b 1/60
[58] Field of Search ..............................352/172, 170, 171

[56] References Cited

UNITED STATES PATENTS

| | | | |
|---|---|---|---|
| 3,578,856 | 5/1971 | Thate et al. | 352/172 |
| 2,392,212 | 1/1946 | Zuber | 352/171 |
| 3,297,397 | 1/1967 | Grant et al. | 352/170 X |
| 3,414,269 | 12/1968 | Appel | 352/172 X |

FOREIGN PATENTS OR APPLICATIONS

| | | | |
|---|---|---|---|
| 702,167 | 1/1954 | Great Britain | 352/172 |

*Primary Examiner*—Louis R. Prince
*Assistant Examiner*—Joseph W. Roskos
*Attorney*—William F. Pinsak

[57] ABSTRACT

A film footage indicator for movie cameras including a power source operable to drive a driving worm gear when the film is being advanced, a driven worm gear having a single row of teeth helically offset on the periphery thereof which are engageable with and driven by the driving worm gear, a pinion gear rigidly mounted on a shaft which is coaxial with but rotatable relative to the driving worm gear and in mesh with and rotated by the driven worm gear teeth, an indicator worm gear rotatable by the pinion gear, a spring indicator flexibly operable to engage the indicator worm gear by inserting a film cartridge into the camera and flexibly operable to be advanced by the rotating indicator worm gear and a marked window in the camera housing located in alignment with the advancement of the spring indicator for indicating the amount of exposed film. Upon removal of the cartridge from the camera, the spring element indicator will automatically disengage from the indicator worm gear and return to the initial (start) position.

9 Claims, 4 Drawing Figures

Patented March 21, 1972
3,650,611
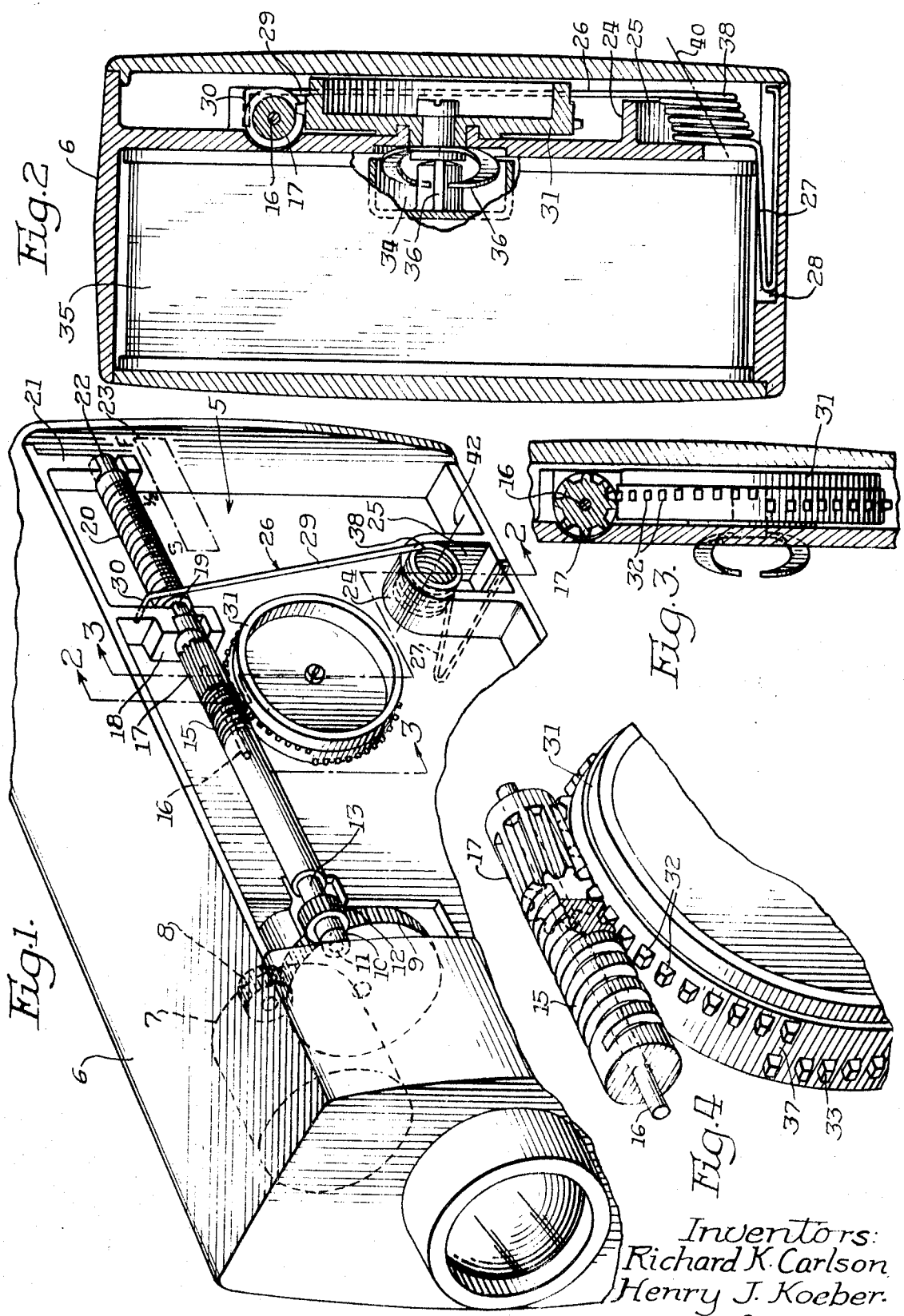
Inventors:
Richard K. Carlson
Henry J. Koeber.
By William F. Pinsak Atty

FILM FOOTAGE INDICATOR

This invention relates to film footage indicators for movie cameras and the like using film cartridges of conventional construction.

Conventional film footage indicators are dials which are rotated by complex gear trains. Other known indicators are slides operated by complex mechanisms. The manufacturing cost of the components and of the assembly for these components is undesirably high.

It is an object of this invention to provide film footage indicator means for denoting the relative, or proportional, measurement of film consumed or exposed, as well as that remaining for exposure.

It is another object of this invention to provide a spring indicator flexibly operable to engage an indicator worm gear in response to insertion of a film cartridge into the camera and flexibly operable to be indexed by the indicator worm gear in response to rotation thereof.

It is another object of this invention to provide a spring indicator flexibly operable to automatically disengage from the indicator worm gear and return to the initial S (start) position when the film cartridge is removed from the camera.

It is a further object of this invention to provide an indicator worm gear driving means including the driven worm gear engageable with the driving worm gear for rotation thereby and engageable with a pinion gear for advancing the pinion gear one tooth travel for a full revolution of the driven worm gear.

It is another object of this invention to provide a film footage indicator which can be produced economically in quantity production and which is simple, practical and efficient.

Further and other objects will be apparent from the description of the accompanying drawings, in which like numerals relate to like parts.

IN THE DRAWINGS

FIG. 1 is a perspective view illustrating the film footage indicator mechanism assembly incorporated in a camera;

FIG. 2 is a transverse cross-sectional view taken, substantially, on the line 2—2 of FIG. 1;

FIG. 3 is a fragmentary and enlarged view depicting the helically offset toothed structure of the worm gear engaging the pinion gear for rotating the same; and FIG. 4 is a perspective view of the driving worm gear partially sectioned and in mesh with the driven worm gear and of the helically offset toothed portion of the driven worm gear in mesh with the pinion gear which is driven thereby.

Referring to the various figures, the invention is generally designated 5 and shows a camera 6 in which is mounted a power source 7 provided with a driving pinion 8 in meshing engagement with a spur gear 9 which in turn meshes a driven pinion 12 mounted on trunnion 10 rotating in bearing 11. Reduced portion 13 on shaft 14 serves to provide a driving worm gear 15.

A driven pinion gear 17 rotatably mounted in bearing 18 has a reduced portion 19 from which emanates the indicator worm gear 20 having a trunnion 22 mounted in bearing 21. Shaft 19 is connected to operate independently with reference to driving worm gear 15 by means of connecting axle 16.

A window 23 with marking S (start), F (finish) and the demarcation of one-half in order to approximately show the film footage record, namely of exposed as well as unexposed portions of film. Driving worm gear 15 drives driven worm gear 31 which is provided with toothed portion 32–33 offset peripherally and helically as shown at 37, a distance equal to the pitch of the teeth of the pinion gear 17. Hence, when worm gear 31 is rotated one complete revolution, it will rotate pinion gear 17 the distance of one tooth so that indicator worm gear 20 is rotated very slowly.

As best shown in FIG. 2, the important structural element of the invention is the spring indicator 26 housed in an elongated arched housing portion as shown at 24, defining a cavity 25. One end of spring 26 is bent, as shown, to form a knee 27 which is actuated by a film cartridge 35, it being seated in a slot 28. The conventional cartridge is equipped with a cavity 34 which exposes a driven clutch portion 36' engageable by a mating clutch member 36 secured to driven worm gear 31.

Referring to FIG. 1, looking through window 23, an upward extending pointer portion 29 of the spring 26 can be seen. Spring 26 terminates in a finger portion 30 formed at substantially right angles to said pointer 29 and adapted to fit and ride in the root of indicator worm gear 20.

When a film cartridge 35 is inserted in the camera compartment provided therefor, clutching member 36 engages its mating component 36' on the cartridge 35 causing the film exposed to be wound up on reels (not shown) therein when the main manipulating control (not shown) is actuated. Simultaneously, the cartridge 35 causes spring knee portion 27 to be depressed moving spring 26 downwardly to the position shown (see FIG. 2). Depressing spring 26 in this manner pulls finger portion 30 downward and displaces the axis 40 of the spring coils 38 at an angle relative to the normal axis 42 (FIG. 1) which substantially causes the pointer portion 29 to swing into engagement with and causes the finger portion 30 to bottom into engagement with the root of indicator worm gear 20 at the S (start) end of window 23.

Actuation of the power source 7 transmitted by driven worm gear 31 rotates indicator worm gear 20 at a predetermined rate which torsionally advances the indicator portion 29 past the window 23 thereby indicating the amount of film exposed.

When the film cartridge 35 is removed from the camera, the knee portion 27 of spring 26 is released and the spring 26 moves upward and the coil axis returns to normal, as shown in FIG. 2, which causes finger portion 30 to raise out of engagement from, and causes indicator portion 29 to swing out of engagement from, the indicator worm gear 20. The torsional effect of indicator portion 29 of spring 26 automatically returns to the initial position when disengaged from indicator worm gear 20.

What is claimed is:

1. A footage indicator mechanism comprising:
   a power source attached to a camera;
   a worm member driven by said power source;
   a worm gear driven by said worm member;
   a spiral worm member coaxially connected to said first mentioned worm member but arranged to operate independently with respect thereto so as to be driven by said worm gear and provided with a threaded extension; and
   dual function spring means provided with a pointer portion having a finger portion adapted to ride in the root portions of said threaded extension and further provided with a knee portion actuatable by the insertion of a film cartridge into said camera automatically setting said finger portion into operative position.

2. The structure defined in claim 1 in which said driven worm gear having the peripheral toothed portion offset at its terminal a distance equivalent to the pitch of said pinion worm.

3. A film footage indicator mechanism comprising:
   a power source;
   a train of reduction gearing driven by said power source including a driving worm gear;
   a rotatable indicator worm gear drive;
   an indicator advanced by rotation of said indicator worm gear when in engagement therewith for indicating the amount of film run; and
   a driven worm gear having a row of teeth engageable with said driving worm gear and engageable with said indicator worm gear drive to transmit rotational movement from said power source to said indicator worm gear drive.

4. A web footage indicator mechanism comprising:
   a footage reference means;
   a powered gear train for advancing the web;
   a threaded member operable by said gear train at a predetermined rate;

a spring member having an integral pointer portion flexibly movable between an initial position and a biased deflected position relative to said footage reference means for indicating the amount of web advanced; and Control means for connecting said spring member to said threaded member to deflect said pointer portion and for disconnecting said spring member from said threaded member permitting said pointer portion to return to said initial position by the biasing effect of said deflected pointer portion.

5. A web footage indicator mechanism as defined in claim 4 wherein said spring member further having an integral finger portion operable between an effective position in engagement with said threaded member and an ineffective disengaged position by said control means.

6. A web footage indicator mechanism as defined in claim 4 further comprising a web supply means and wherein said control means includes an integral portion extending from said spring member operable by said web supply means to connect said spring member to said threaded member.

7. A film footage indicator mechanism in a motion picture camera having a housing, and a film supply cartridge adapted to be inserted and removed from the housing comprising:

a powered gear train for advancing the film;

a threaded member operable by said gear train at a predetermined rate;

a spring member having a first integral portion flexibly movable between an initial position and a deflected position relative to said film footage reference means for indicating the amount of film advanced; and said spring member having a second integral portion operable by said cartridge when inserting said cartridge in the housing for connecting said spring member to said threaded member for deflecting said first integral portion relative to said footage reference means when said threaded member is actuated by said gear train.

8. A film footage indicator mechanism as defined in claim 7 wherein said spring member has a third integral portion operable to disconnect said spring member from said threaded member when said cartridge is removed from said housing.

9. A film footage indicator mechanism as defined in claim 7 wherein said spring member has in integral finger portion operable between an effective position in engagement with said threaded member by inserting said cartridge in said housing and an ineffective disengaged position by removing said cartridge from said housing.

* * * * *